United States Patent
Iotti (10) Patent No.: US 10,538,205 B2
(45) Date of Patent: Jan. 21, 2020

(54) APPARATUS FOR GAINING ACCESS TO LIFT VEHICLES

(71) Applicant: MANITOU ITALIA S.R.L., Castelfranco Emilia (MO) (IT)

(72) Inventor: Marco Iotti, Reggio Emilia (IT)

(73) Assignee: Manitou Italia S.R.L., Castelfranco Emilia (IT)

(*) Notice: Subject to any disclaimer, the term of this patent is extended or adjusted under 35 U.S.C. 154(b) by 0 days.

(21) Appl. No.: 14/813,368

(22) Filed: Jul. 30, 2015

(65) Prior Publication Data

US 2016/0101738 A1   Apr. 14, 2016

(30) Foreign Application Priority Data

Oct. 9, 2014   (IT) .............................. MO2014A0282

(51) Int. Cl.
*B60R 3/02*   (2006.01)
*E06C 5/04*   (2006.01)

(52) U.S. Cl.
CPC . *B60R 3/02* (2013.01); *E06C 5/04* (2013.01)

(58) Field of Classification Search
CPC ..... E06C 5/02; E06C 5/04; E06C 9/08; A62B 1/02
See application file for complete search history.

(56) References Cited

U.S. PATENT DOCUMENTS

| | | | | |
|---|---|---|---|---|
| 790,195 | A * | 5/1905 | Elkins | B61D 23/02 105/445 |
| 1,198,357 | A * | 9/1916 | Kirkley | B60R 3/02 105/427 |
| 1,283,640 | A * | 11/1918 | Blatzer | E06C 5/04 182/66.1 |
| 1,494,295 | A * | 5/1924 | Smith | B61D 23/02 105/448 |
| 2,667,296 | A * | 1/1954 | Troche | E06C 5/04 182/68.1 |
| 3,039,562 | A * | 6/1962 | Wagner | B60R 3/02 182/91 |
| 3,291,255 | A * | 12/1966 | Glatfelter | B60R 3/02 182/88 |
| 3,605,943 | A * | 9/1971 | Beaudet et al. | E06C 5/04 182/66.2 |
| 3,606,382 | A * | 9/1971 | Pollock | B60R 3/02 280/166 |
| 3,606,934 | A * | 9/1971 | Johansen | E06C 5/02 182/97 |
| 3,834,490 | A * | 9/1974 | Ford | B60R 3/02 182/88 |

(Continued)

FOREIGN PATENT DOCUMENTS

DE   10033386 A1   1/2002
DE   102012013880 A1   1/2013

(Continued)

*Primary Examiner* — Alvin C Chin-Shue
*Assistant Examiner* — Candace L Bradford
(74) *Attorney, Agent, or Firm* — Pearne & Gordon LLP (57) ABSTRACT

An apparatus (1) for ascending to the driver's cab of a telescopic handler or the like, including: a ladder (10) which in turn includes at least two parts (11, 12) of which at least one is movable; and an automatic device (3) for moving the movable part (11, 12).

10 Claims, 6 Drawing Sheets

(56) References Cited

U.S. PATENT DOCUMENTS

| | | | | |
|---|---|---|---|---|
| 3,853,369 | A * | 12/1974 | Holden | B60R 3/02 296/62 |
| 3,869,022 | A * | 3/1975 | Wallk | E02F 9/00 182/96 |
| 4,020,920 | A * | 5/1977 | Abbott | B60R 3/02 182/19 |
| 4,029,223 | A * | 6/1977 | Adamski | B60R 3/02 414/546 |
| 4,161,997 | A * | 7/1979 | Norman | E06C 5/00 182/127 |
| 5,085,450 | A * | 2/1992 | DeHart, Sr. | B60R 3/02 280/166 |
| 5,205,603 | A * | 4/1993 | Burdette, Jr. | B60R 3/02 182/195 |
| 5,280,934 | A * | 1/1994 | Monte | B60R 3/02 182/127 |
| 5,366,052 | A * | 11/1994 | Keh-Lin | E06C 5/02 182/127 |
| 5,803,523 | A * | 9/1998 | Clark | B60P 1/435 14/71.1 |
| 6,484,344 | B1 * | 11/2002 | Cooper | A61G 3/061 14/71.1 |
| 7,302,725 | B2 * | 12/2007 | Thygesen | B60P 1/43 14/69.5 |
| 7,905,324 | B2 * | 3/2011 | Gil | E02F 9/0833 182/127 |
| 8,146,935 | B1 * | 4/2012 | Adams | B60R 3/02 280/164.1 |
| D713,772 | S * | 9/2014 | Ziaylek | D12/203 |
| 9,194,180 | B2 * | 11/2015 | Hedley | E06C 5/02 |
| 9,205,896 | B2 * | 12/2015 | Mueller | B63B 27/146 |
| 2002/0166723 | A1 * | 11/2002 | Huber | E06C 5/24 182/127 |
| 2004/0159492 | A1 * | 8/2004 | Hedley | B60R 3/02 182/86 |
| 2005/0285365 | A1 * | 12/2005 | Manser | B60R 3/02 280/163 |
| 2006/0272896 | A1 * | 12/2006 | Rajewski | E06C 1/12 182/127 |
| 2009/0038885 | A1 * | 2/2009 | Ellement | B60R 3/02 182/97 |
| 2011/0017122 | A1 * | 1/2011 | Muller | B63B 27/146 114/362 |
| 2012/0181109 | A1 * | 7/2012 | Rund | B60R 3/02 182/97 |
| 2013/0048400 | A1 * | 2/2013 | Holdener | B60R 3/02 180/89.1 |
| 2015/0076785 | A1 | 3/2015 | Kokot | |
| 2017/0036608 | A1 * | 2/2017 | Du | B60R 3/02 |

FOREIGN PATENT DOCUMENTS

| | | | | |
|---|---|---|---|---|
| GB | | 243591 A | * 12/1925 | E06C 5/04 |
| GB | | 243591 A | * 12/1925 | E06C 5/04 |
| JP | | 2003312366 A | 11/2003 | |
| WO | | 2013103456 A1 | 7/2013 | |
| WO | | 2013156219 A1 | 10/2013 | |

* cited by examiner

APPARATUS FOR GAINING ACCESS TO LIFT VEHICLES

FIELD OF THE INVENTION

The present invention has for an object an apparatus for gaining access to lift vehicles or telescopic handlers or the like.

In detail, the invention is especially but not exclusively intended for large-sized telescopic lifts as those used in mines.

DESCRIPTION OF RELATED ART

The machines of the type mentioned are provided with a tracks or wheels-mounted movable frame, whereon a driver's cab is fitted at a height from the ground such that a ladder is required to allow the operator to get on and off the driving seat of the vehicle.

The ladder is located under the driver's cab and consists of two or three steps, one above the other, arranged relative to the body of the frame. The solution of the prior art is not satisfactory in terms of safety for more than one reason.

First, while getting off the vehicle, the operator must try to place his foot onto the lower step gropingly, that is to say, he must have a sensation of the space below his foot, without having a chance to see directly where the lower step is placed.

Obviously such a condition may carry the risk that the operator cannot rest his feet stably, or he/she may slip in the attempt of getting off the vehicle, thus falling to the ground.

This drawback is known to be exacerbated by the fact that work machines inevitably get dirty with soil or sand due to the environment wherein they operate.

Additionally, at present, large-sized vehicles are required by the market, for which reason the length of ladders of the known type comes to be insufficient; indeed, use thereof leads to the result that the operator, having reached the lower step, must make a jump to reach the ground with the obvious risks thereto related.

On the other hand, it is not possible to extend the ladder inferiorly to the frame of the vehicle, within the space below, wherein the wheels (or tracks) are housed, since the protruding part would inevitably bump into the ground or other obstacles.

Thus, the aim of the present invention is to make available an apparatus for gaining access to the vehicle, i.e. for getting on and off the driver's cab of a telescopic handler, air platform, or the like.

SUMMARY OF THE INVENTION

Said aim is attained by a stabilization apparatus realized according to claim 1.

BRIEF DESCRIPTION OF THE DRAWINGS

Further characteristics and advantages of the present invention will become more apparent from the indicative, and therefore non-limiting, embodiment of a preferred but not exclusive apparatus for gaining access to the vehicle according to the invention, as illustrated in the accompanying drawings, wherein.

DETAILED DESCRIPTION OF PREFERRED EMBODIMENTS OF THE INVENTION

With reference to the attached figures, it is generically indicated by 1 the access apparatus of the invention.

The apparatus 1 herein disclosed, is particularly destined for being used with lifts, or telescopic handlers or the like, herein also generally called "lift vehicle".

In detail, the invention is especially but not exclusively intended for large-sized handlers, for example of the stationary and non-rotatable type, such as those used in mines.

In this case, vehicles are preferably used for the purposes of maintenance works on large mining machines, and can be used to replace large hydraulic or mechanical components, such as hydraulic cylinders of considerable size or the like, which are generally implemented on said large machines.

The apparatus 1 herein described has the function to allow the driver of the handler to get on and off the driver's cab with comfort and safety.

More generally speaking, the invention comprises a ladder 10, for example a metal ladder, for access to the cab, which ladder 10 comprises at least two parts 11, 12, each preferably provided with at least one step 21, 22, 23, at least one of which parts 11, 12 being movable upon actuation of a special automatic device 3 included within the apparatus 1 herein provided.

In detail, the ladder 10 is arranged between the cab and the ground, preferably immediately below the access door of the driver's cab. In a preferred embodiment of the invention, aforesaid two parts 11, 12 of the ladder 10 are both movable and, still more preferably, they are movable relative to one another and/or relative to the vehicle, whereon the apparatus 1 is fitted; this aspect will be further discussed in a later section, when describing the structure of the ladder 10 in detail.

To be precise, the vehicle provided with the inventive apparatus 1, can be of the type comprising a frame mounted on wheels and movable thereon, supplied with a body 4, on which frame the driver's cab is fitted, generally in a lateral position. In such a case, the ladder 10 of the invention is movable between a retracted space-saving position, (see FIG. 1), wherein said ladder preferably does not protrude relative to the body 4, and an extended position thereof (see FIG. 2), wherein it projects out relative to the body 4, thereby favoring access to the driver's cab.

Preferably, the frame comprises a tank assembly 5, e.g. including a tank, or any other frame module, placed directly under the cab, whose external shell (i.e. the casing) is part of the body 4 of the frame.

Here, said shell 4 of the tank (or generally "tank assembly") is provided with a recess, located immediately below the cab which houses the apparatus 1 of the invention.

To be precise, when the ladder 10 is in the retracted position thereof, it is preferably completely contained within the recess, thus not occupying the space outside the body 4 whilst, in the extended position thereof, it projects out relative to the recess and the body 4 in its entirety, so as to allow the operator to get on and off the cab more easily, in a manner which will be better detailed hereinafter.

The ladder 10 of the invention preferably comprises a first part 11 and a second part 12 slidable relative to the first part 11.

In detail, the first part 11 may be superiorly positioned and arranged immediately below the cab, the second part 12 being able to slide away from the cab.

To be precise, the second part 12 is adapted to translate axially relative to the first part 11, so as to allow lengthening or shortening of the ladder 10.

This translation can occur via a slidably coupling between the two parts 11, 12, thus defining a telescopic ladder 10.

In addition or in alternative to such movement, the ladder 10, or at least a movable part thereof, is suitable for oscillating in rotation.

In detail, the first part 11 can be hinged at a proximal end portion 100, i.e. closer to the cab, relative to which the second part 12 can slide towards or away, thus coming to define lengthening and shortening of the 10 ladder.

In this preferred embodiment, both the first and second part 12 of the ladder 10 are movable, the second part 12 sliding relative to the first part 11, but being solidly constraint with the latter during rotation.

Figure 1:
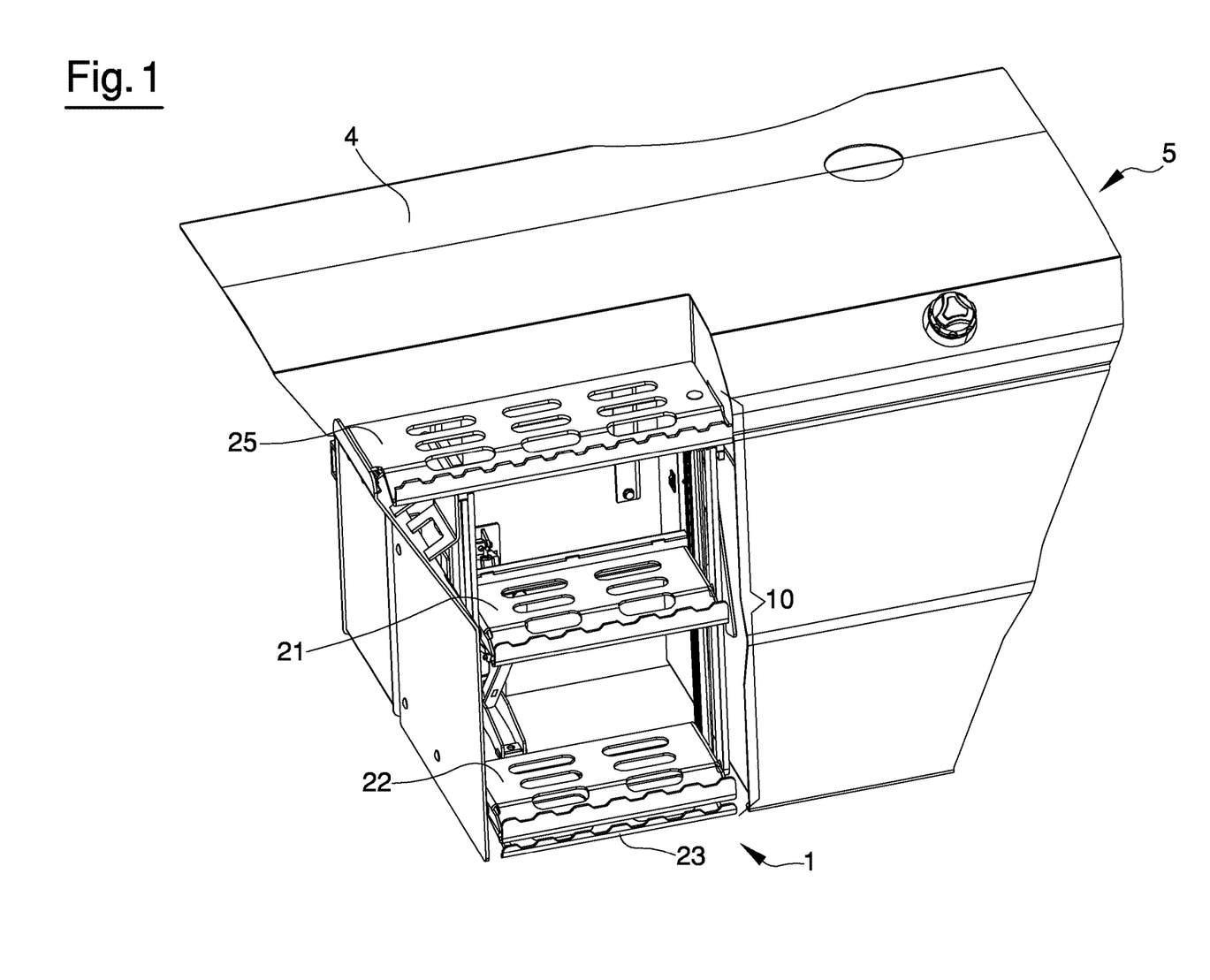
FIG. 1 is an isometric view of the apparatus according to the invention, in one operational arrangement thereof, the apparatus being mounted on a structural unit of a vehicle.
Figure 5:
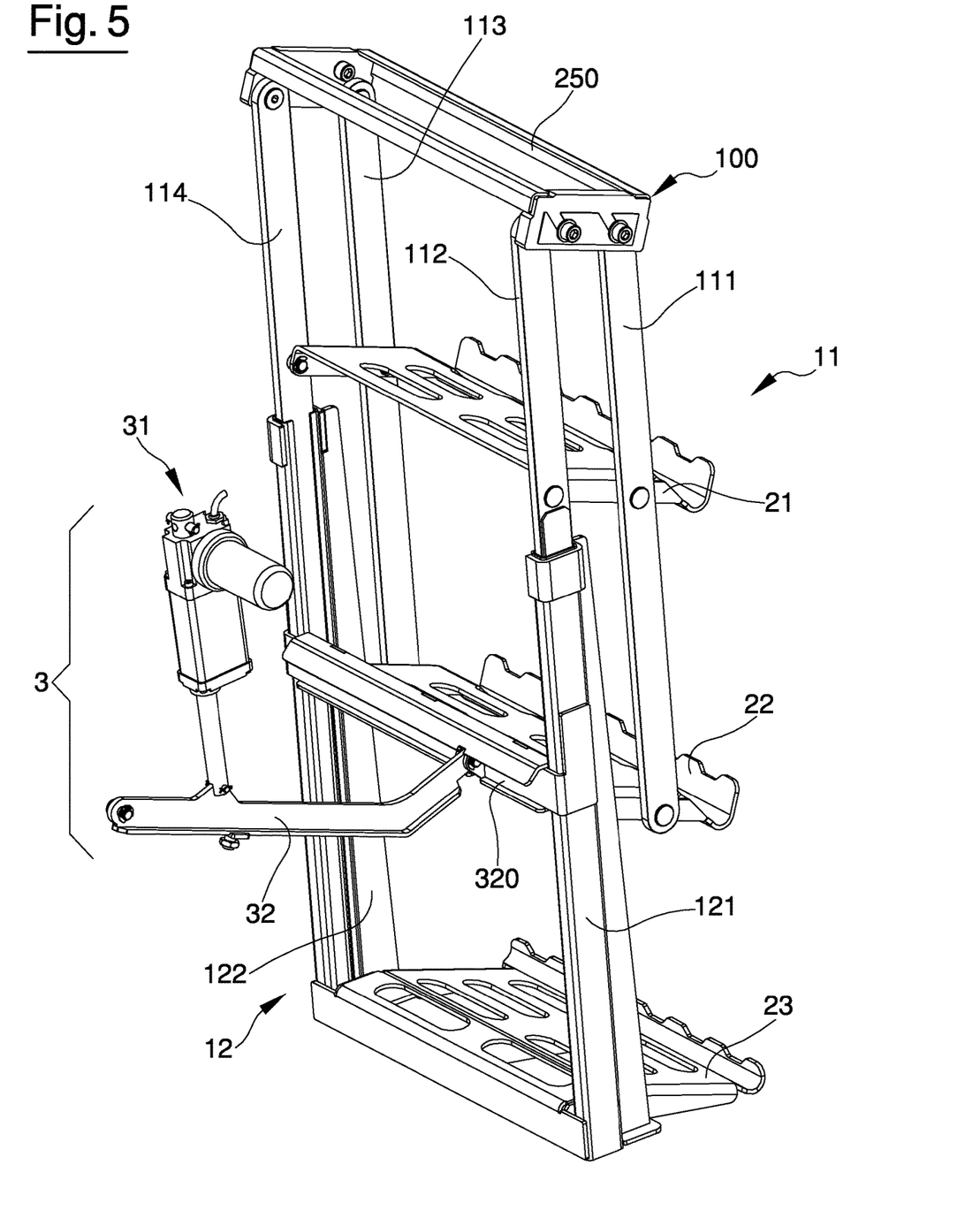
FIG. 5 is a rear isometric view of at least a part of the apparatus taken alone.
Figure 6:
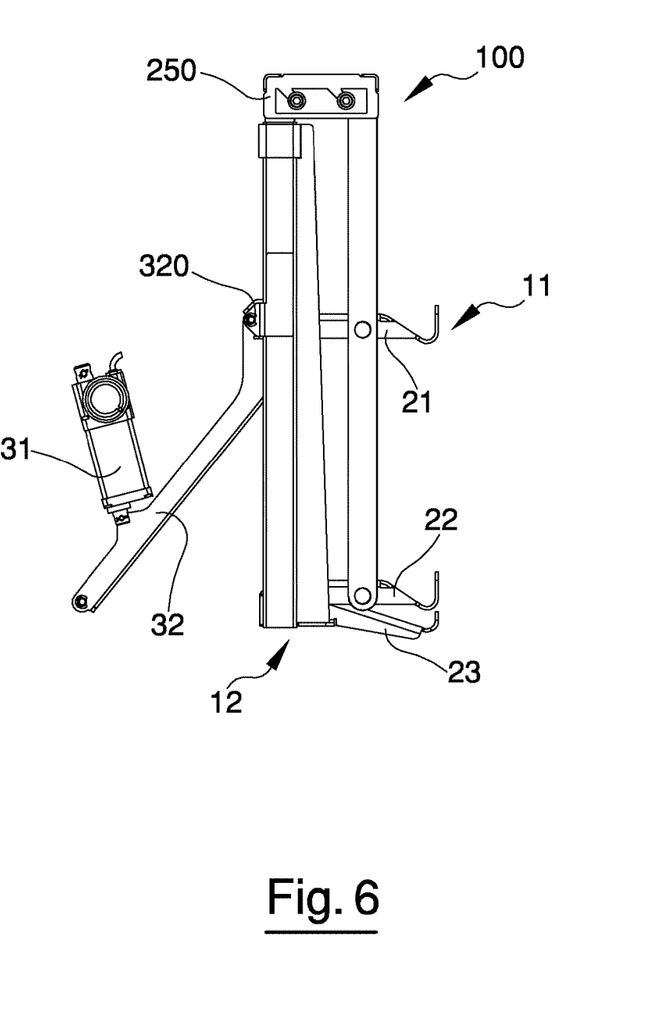
FIGS. 6 and 7 are side views of the apparatus of the preceding figure in different operational arrangements.

In this case, when in the retracted position thereof (as illustrated in FIGS. 1 and 6), the ladder 10 is in its minimum length configuration and is attached or in close proximity to the vehicle (and preferably received in the recess); conversely, in the extended position of use, the ladder 10 is in the elongated configuration thereof (shown in FIGS. 2, 3, 5 and 7), wherein it projects out obliquely from the frame of the vehicle, and downwards, towards the ground.

Even more in detail, the ladder 10 can be extended downwards and tilted outwards, while rotating about the hinge (or hinges) on the upper end 100, the lower end being free and, preferably, provided with a step 23.

When the ladder 10 is elongated, its second part 12 protrudes downwards from the frame, next to the area where wheels or tracks are located.

Figure 2:
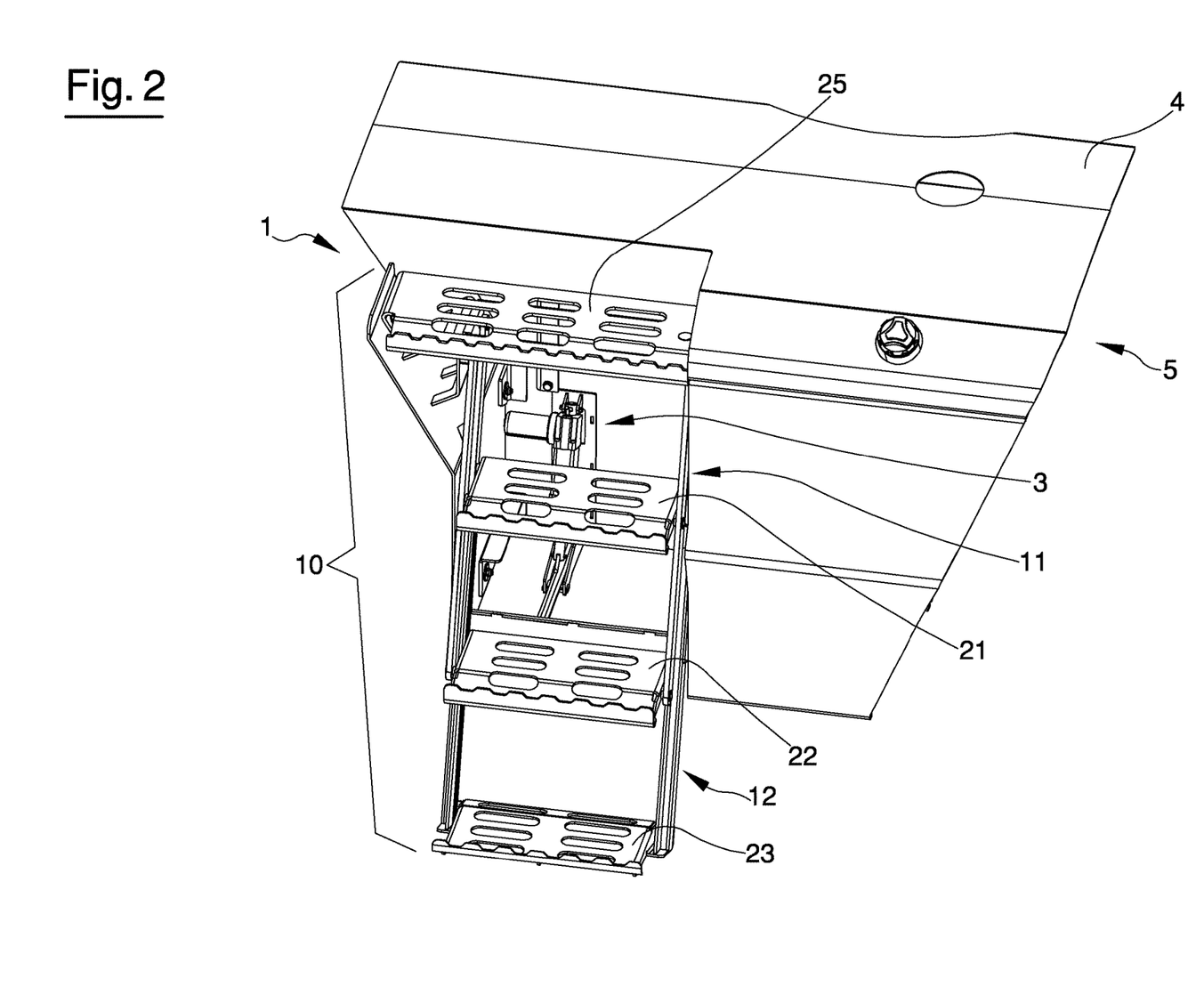
FIG. 2 is an axonometric view of the apparatus of the preceding figure in a different operational arrangement thereof.
Figure 3:
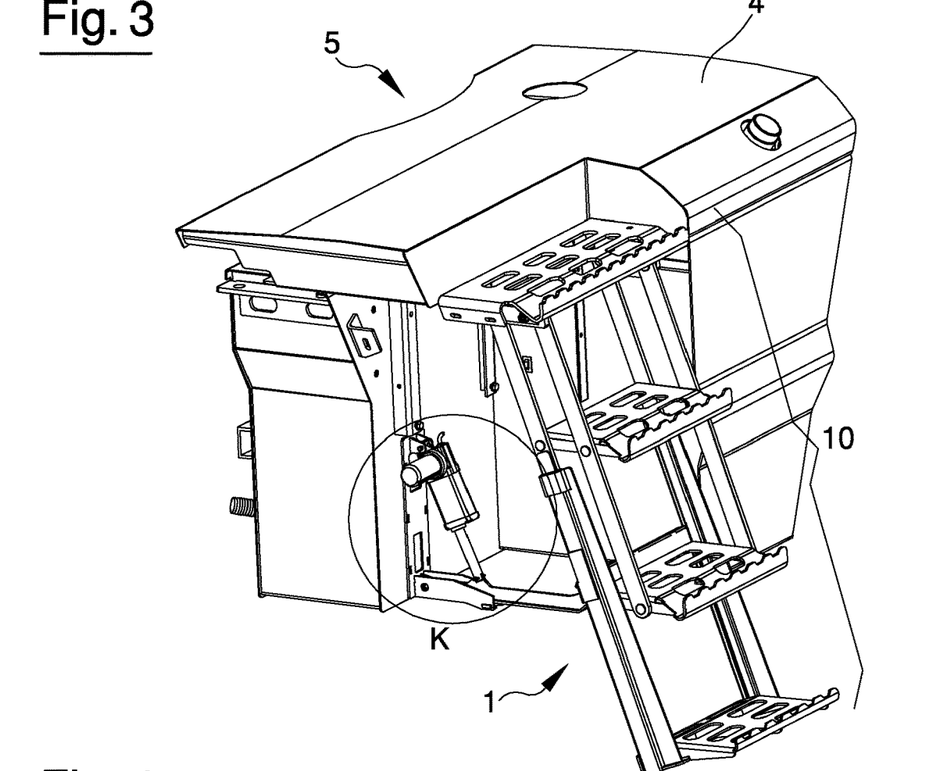
FIG. 3 is a further axonometric view of the apparatus in the operational arrangement shown in FIG. 2.

As shown in FIGS. 1, 2 and 3, the apparatus 1 of the invention can include an upper support element 25, which comprises a step 25 of the ladder 10, relative to which element the first part 11 of the ladder 10 is hinged, thereby enabling above-described oscillation.

In other words, the upper step 25 of the ladder 10, that is to say, the one placed directly under the driver's cab, can be the element to which the first part 11 of the ladder 10 is hinged, which ladder 10 in turn preferably includes a plurality of steps 21, 22.

Preferably, as shown in detail in FIGS. 3 and 5, the first part 11 of the ladder 10 comprises two articulated parallelograms, arranged on parallel planes, the respective major sides 111, 112, 113, 114 of which are transversely joined at least by intermediate steps 21, 22.

In detail, the two articulated parallelograms define the opposite sides of the first part 11 of the ladder 10 and are both hinged to said upper supporting element 25, for example relative to a fixing frame 250, which joins them superiorly, so as to allow the oscillating movement of the ladder 10, that is to say of both its first and second parts 11, 12.

The intermediate steps 21, 22 are then hinged at opposite ends to the long sides 111, 112, 113, 114 of the two articulated parallelograms, which are constituted by respective bars or plates or rods or the like; the intermediate steps 21, 22 are interposed between said articulated parallelograms, so as to define cross members.

In this manner, the intermediate steps 21, 22 are always parallel one to another and preferably horizontal at any angular position of the ladder 10. It will be appreciated that the invention may provide a different number of steps according to the requirements of a specific application, despite the fact that apparatus 1 herein provided comprises two intermediate steps 21, 22, an upper step 25 and a lower step 23, as illustrated in the appended figures.

However, a non-preferential embodiment is not to be excluded, wherein the first part 11 of the ladder 10 may comprise only one parallelogram or in alternative three or more articulated parallelograms.

Based on the configuration description of the above invention, it appears clear that the inventive ladder 10 allows the operator to immediately see the steps 21, 22, 23, 25, i.e. the points where on his feet shall be resting when getting off the cab.

Indeed, given that the ladder 10 can oscillate inwards the frame, thereby coming to be arranged conversely with respect to the fixed ladders of the known type, i.e. in a projecting and not vertical position, then the operator, by looking down, can always see the point whereon he's resting his feet.

Therefore, by using the apparatus herein disclosed, the risks of falling are significantly reduced.

Figure 7:
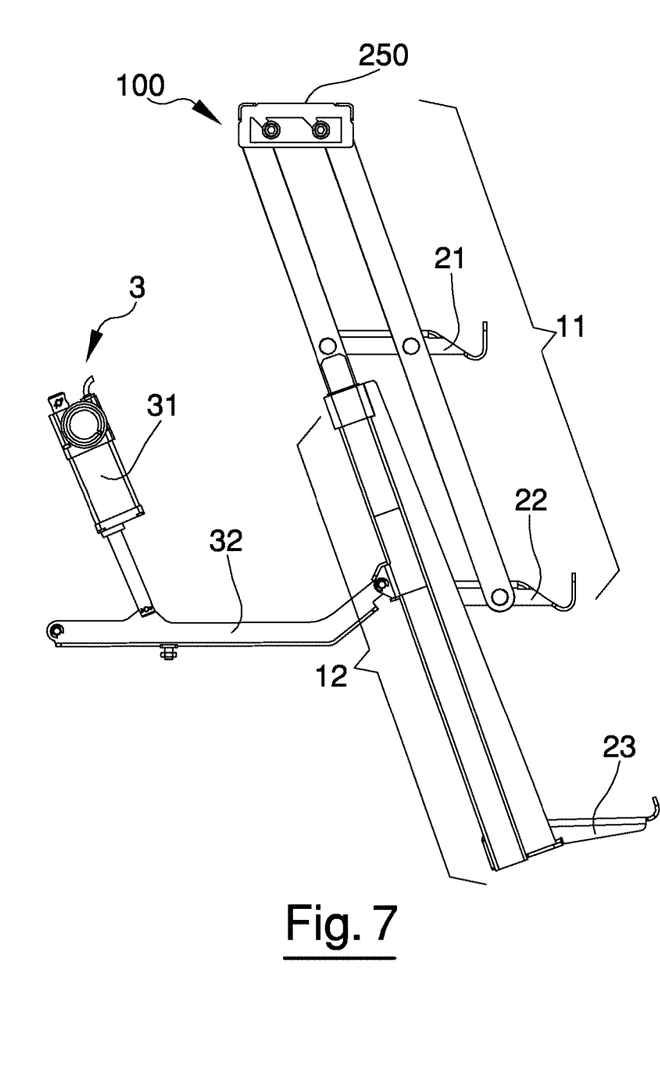
Figure 8:
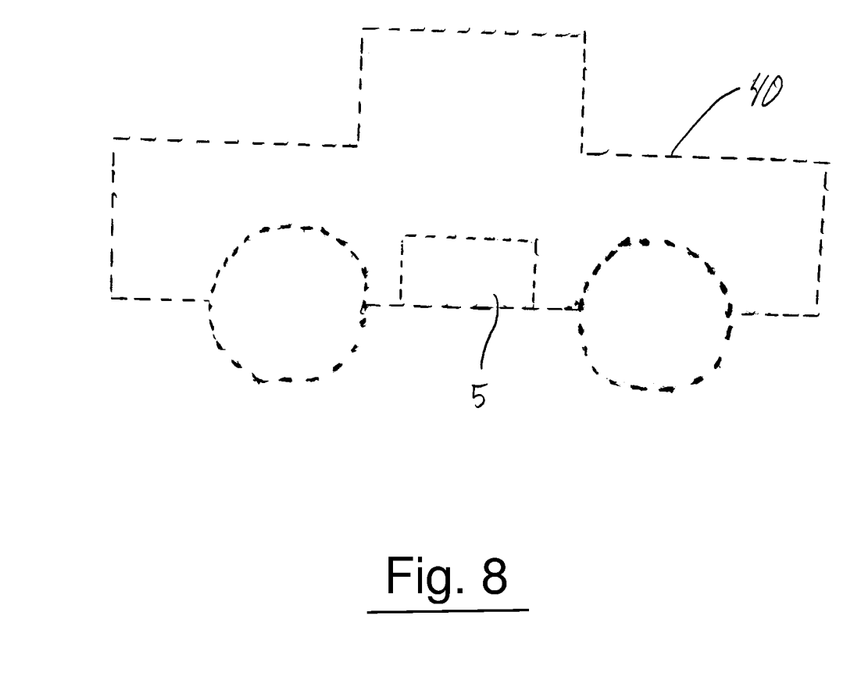
FIG. 8 is a schematic illustration of a lift vehicle (40).

In detail, the second part 12, as it appears clear from FIGS. 5, 6 and 7, is preferably slidably coupled to the rear long sides 112, 114 of the two parallelograms, so that it can be pulled out upon command of said automatic displacement device 3.

More precisely, the second lower part 12 may comprise two bars 121, 122 or parallel rods or plates 121, 122, slidingly coupled to the corresponding rear long sides 112, 114 of different parallelograms, and joined inferiorly by said lower step 23, thus defining a U-shaped structure.

Since, as said, the ladder 10 can be extended under the frame with the second sliding part 12 thereof, then said lower step 23 comes to be arranged in an intermediate position between the bottom of the frame and the ground, with obvious advantages in terms of accessibility.

It should be noted that, the parallel bars 121, 122 may preferably have an inner C-shaped profile in order to slidably contain the bars 112, 114 which define the mentioned major sides of the parallelograms.

The operation of the ladder 10 will be detailed following the description of preferential constructive aspects of the displacement device 3 which actuates movement thereof.

The device 3 includes at least one linear actuator 31, such as an electric jack, and a push rod 32 to which the actuator 31 is hinged.

The push rod 32 is rotatingly coupled, preferably relative to a distal end thereof, to at least a movable part of the ladder 10.

It should be appreciated that the actuator 31 can be constituted by a mechanical jack or a hydraulic cylinder or any other devices provided they are suitable for the purpose.

In practice, the push rod 32 may be hinged to a connection beam 320 integrally coupled to the second part 12 of the ladder 10, as clearly shown in FIGS. 5, 6 and 7.

The push rod, which may essentially comprise a bar 32 or a plate suitably shaped, e.g. a shaped-crank plate, can exhibit a proximal end hinged to a fixed unit.

Figure 4:
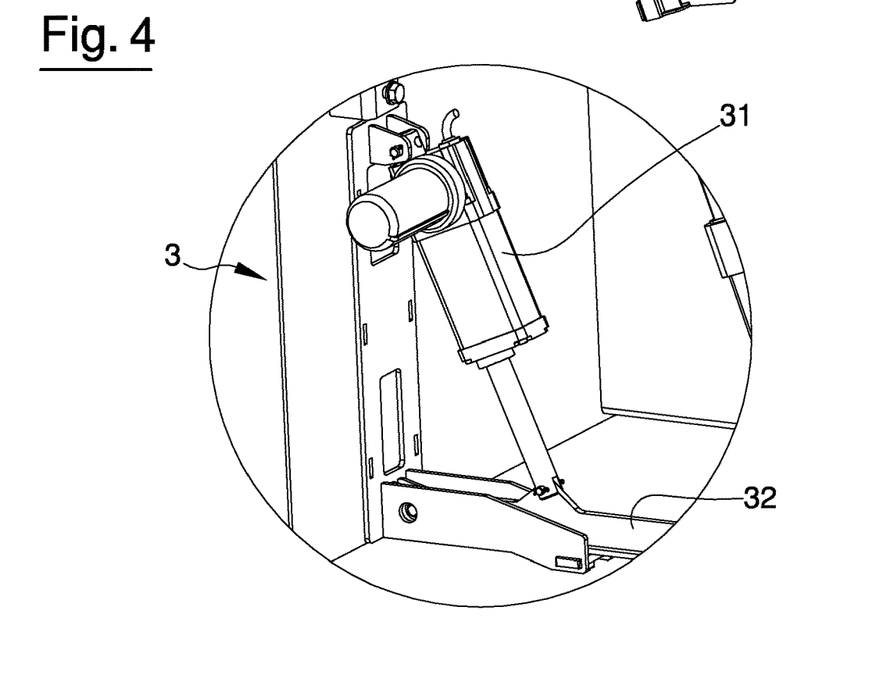
FIG. 4 is an enlarged view of the detail K of the preceding figure.

In detail, such a fixed unit may be constituted by the frame of the vehicle, and more specifically by the inner wall of said recess, i.e. by the shell 4 of the set of tanks 5, as shown in FIGS. 2, 3 and 4.

However, the push rod 32 can oscillate between a first oblique position, wherein its distal end is higher, and a second position, wherein it is disposed substantially horizontal, and its distal end is pushed outwards (compare FIGS. 6 and 7).

Owing to this particular configuration, when the push rod 32 is in the first position, the ladder 10 is in the retracted configuration thereof, wherein it is substantially vertical, it is preferably contained within aforesaid recess and in any case it exhibits its minimum length (see FIG. 6); when instead the push rod 32 is in the second position, the ladder 10 is in the extended configuration thereof, wherein it projects out obliquely from the vehicle frame exhibiting its maximum length.

Indeed, when the linear actuator 31 is operated by pushing onto the push rod 32 (to which the former is hinged, for example at a middle position), the push rod 32 rotates downwards and pushes said connection beam 320 forwards (or outwardly relative to the side of the vehicle), thereby causing rotation of the ladder 10, and downwards, thereby causing the second part 12 to be pulled out.

In other words, at the moment when the driver must get off the vehicle, following the opening of the door or by pressing a button or the like, the linear actuator 31 is activated, thereby enabling the ladder 10 to be arranged in an extended configuration, wherein the driver not only can see the steps 21, 22, 23 below, thanks to the fact that the ladder 10 is protruding laterally, but he also has available at least one extra step 23 unlike the prior art, since the ladder 10 extends below the frame, next to the ground (see FIG. 2).

In this way, the driver does not have to "go blind" when putting his feet onto the steps, nor does he/she have to make a final jump to the ground from a certain height.

Therefore, use of the inventive apparatus decreases the risk that the driver falls to the ground or gets hurt otherwise.

Clearly, this extended configuration of the ladder 10 can be of aid also in the step of boarding the driver's cab.

Once the driver is in the cab, the actuator 31, upon command of suitable sensing means, as a door sensor or a button, or via a vehicle ignition, pulls the push rod 32 which rotates upwards thereby slidingly dragging the second part 12 and placing it close to the first part 11; meanwhile, the push rod 32 causes the ladder 10 to rotate towards the side of the frame, thereby bringing it within the recess, substantially retractably.

In this manner, the operator can continue driving the vehicle even on off-road, without the ladder 10 being in no way cumbersome either laterally nor inferiorly relative to the frame line (FIG. 1).

When the ladder 10 is in the retracted configuration thereof, the lower step 23 can go to strike onto one of above mentioned intermediate steps 22 or at least be in close proximity therewith.

The invention claimed is:

1. A telescopic handler comprising an apparatus (1) for gaining access to a driver's cab of the telescopic handler, the apparatus (1) comprising a ladder (10) in turn comprising at least two movable parts (11, 12), the two movable parts being a first part (11) and a second part (12), both of which are able to oscillate with rotation movements;
wherein the apparatus (1) comprises an automatic device (3) for moving said movable parts (11,12);
wherein said second part (12) is slidable with respect to the first part (11);
wherein the ladder (10) includes a first step (21) and a second step (22);
wherein an upper support element (25) of the ladder (10) is provided, at which the first part (11) is hinged;
wherein the first part (11) of the ladder (10) comprises a first articulated parallelogram (111, 112) and a second articulated parallelogram (113, 114), the first and second articulated parallelograms being arranged on parallel planes, the first articulated parallelogram having a first front side (111) and a first rear long side (112), the second articulated parallelogram having a second front side (113) and a second rear long side (114); the first front side (111) and the first rear long side (112) being transversely joined to the second front side (113) and the second rear long side (114) by said first and second steps (21, 22) of the ladder (10);
wherein said articulated parallelograms define opposite sides of the first part (11) and being both hinged to the upper support element (25), which joins the articulated parallelograms superiorly, so as to allow oscillating movements of the ladder (10); wherein the second part (12) comprises two bars (121, 122) slidingly coupled to respective corresponding first and second rear long sides (112, 114) and joined inferiorly by a third step (23), defining a U-shaped structure; and
wherein said automatic device (3) comprises a linear actuator (31) and a push rod (32) to which the linear actuator (31) is connected, the push rod (32) being hinged to the second part (12) so that when the telescopic handler is on a ground surface and when the automatic device (3) actuates from a retracted position to an extended position, the push rod (32) (a) causes a bottom of the first part (11) to rotate in a curved direction upwardly and away from the linear actuator (31) and away from the ground surface and (b) simultaneously acts directly on the second part (12) and forces the second part (12) to slide with respect to the first part (11) in a direction away from the upper support element (25).

2. The telescopic handler according to claim 1, wherein the second part (12) is able to axially shift with respect to the first part (11), so as to enable lengthening or shortening of the ladder (10).

3. The telescopic handler according to claim 1, wherein said first part (11) is hinged at an end portion (100) and wherein the second part (12) is able to slide away from said end portion of the first part (11).

4. The telescopic handler according to claim 3, said support element comprising a further step (25) of the ladder (10).

5. The telescopic handler according to claim 1, wherein the second part (12) is borne by the first part (11).

6. The telescopic handler according to claim 1, wherein said second part (12) includes a further step (23) of the ladder (10).

7. The telescopic handler according to claim 1, wherein the linear actuator (31) is hinged to the push rod (32).

8. The telescopic handler according to claim 1, comprising a tank assembly, the apparatus (1) being part of the tank assembly, the tank assembly further comprising a shell (4) provided with a recess that houses said apparatus (1).

9. The telescopic handler according to claim 1, wherein the telescopic handler is provided with a body (4), wherein said ladder (10) of the apparatus (1) is movable between a retracted position of minimum encumbrance and an extended position in which it protrudes with respect to said body (4).

10. A telescopic handler comprising an apparatus (1) for gaining access to a driver's cab of the telescopic handler, the apparatus (1) comprising a ladder (10) in turn comprising at least two movable parts (11, 12), the two movable parts being a, first part (11) and a second part (12), both of which are able to oscillate with rotation movements;
- wherein the apparatus (1) comprises an automatic device (3) for moving said movable parts (11, 12), the automatic device (3) comprising at least one linear actuator (31) and a push rod (32) to which the linear actuator (31) is hinged;
- wherein said second part (12) is sildable with respect to the first part (11);
- wherein said first part (11) is hinged at an end portion (100) and the second part (12) is able to slide away from said end portion (100) of the first part (11);
- said push rod (32) being hinged to a connection beam (320) coupled to the second part (12) of the ladder (10) so that when the telescopic handler is on a ground surface and when the automatic device (3) actuates from a retracted position to an extended position, the push rod (32) (a) causes a bottom of the first part (11) to rotate in a curved direction upwardly and away from the linear actuator (31) and away from the ground surface and (b) simultaneously acts directly on the second part (12) and forces the second part (12) to slide with respect to the first part (11) in a direction away from said end portion (100).

\* \* \* \* \*